United States Patent
Kolesnik et al.

(10) Patent No.: US 9,749,288 B2
(45) Date of Patent: Aug. 29, 2017

(54) MANAGEMENT OF NETWORK ADDRESS POOLS

(71) Applicant: Red Hat Israel, Ltd., Raanana (IL)

(72) Inventors: Michael Kolesnik, Raanana (IL); Mordechay Asayag, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 159 days.

(21) Appl. No.: 14/627,467

(22) Filed: Feb. 20, 2015

(65) Prior Publication Data
US 2016/0248732 A1  Aug. 25, 2016

(51) Int. Cl.
*G06F 17/30* (2006.01)
*G06F 9/50* (2006.01)
*H04L 29/12* (2006.01)
*H04L 29/08* (2006.01)

(52) U.S. Cl.
CPC ...... *H04L 61/2061* (2013.01); *H04L 61/2007* (2013.01); *H04L 69/324* (2013.01); *H04L 61/2038* (2013.01); *H04L 61/6022* (2013.01); *H04L 61/6095* (2013.01)

(58) Field of Classification Search
CPC ........... H04L 61/2015; H04L 29/12018; H04L 61/10; H04L 61/6022; H04L 29/12839; H04L 29/12216; H04L 61/20; H04L 45/54; H04L 45/60; H04L 29/12009; H04L 29/12207; H04L 29/12367; H04L 61/2514

USPC ......... 709/245, 223; 370/401, 392, 469, 252
See application file for complete search history.

(56) References Cited

U.S. PATENT DOCUMENTS

| | | | |
|---|---|---|---|
| 7,444,405 B2 | 10/2008 | Gangadharan | |
| 7,822,033 B1 | 10/2010 | Parker et al. | |
| 7,873,711 B2 | 1/2011 | Adams et al. | |
| 7,970,873 B2 | 6/2011 | Nguyen et al. | |
| 8,560,658 B2 | 10/2013 | Bedare et al. | |
| 8,868,783 B2 | 10/2014 | Schomp | |
| 9,391,949 B1* | 7/2016 | Richardson | H04L 61/1511 |
| 2002/0138614 A1* | 9/2002 | Hall | H04L 29/12009 709/225 |
| 2011/0119382 A1* | 5/2011 | Shaw, Jr. | G06F 11/3664 709/226 |
| 2014/0025821 A1* | 1/2014 | Baphna | H04L 61/2061 709/226 |
| 2014/0040440 A1 | 2/2014 | Christopher et al. | |

* cited by examiner

*Primary Examiner* — Patrice Winder
*Assistant Examiner* — Abderrahmen Choat
(74) *Attorney, Agent, or Firm* — Lowenstein Sandler LLP

(57) ABSTRACT

Systems and methods for storing and managing pools of network addresses. An example method may comprise: identifying, in a data structure representing a pool of network addresses, an index value of an element having a defined state; determining, by a processing device, a network address in view of the index value and a base network address associated with the pool; and modifying the state of the element of the data structure.

20 Claims, 5 Drawing Sheets

MANAGEMENT OF NETWORK ADDRESS POOLS

TECHNICAL FIELD

The present disclosure is generally related to virtualized computer systems, and is more specifically related to systems and methods for storing and managing pools of network addresses.

BACKGROUND

Computing devices often utilize network addresses to identify one another in a computer networking environment. A network address may be a unique value associated with a network interface to distinguish the network interface from other network interfaces in a computer network. The network address may take the form of a Media Access Control (MAC) address and may be assigned by a computing device manufacturer when a physical network interface card is created. In a virtualized environment, there may be both physical network interfaces and virtual network interfaces. The virtual network interfaces may be dynamically generated and may appear to operate similar to a physical network interface. Millions of virtual network interfaces may be dynamically generated within a data center and each may be associated with a network address that is unique to a particular computer network.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
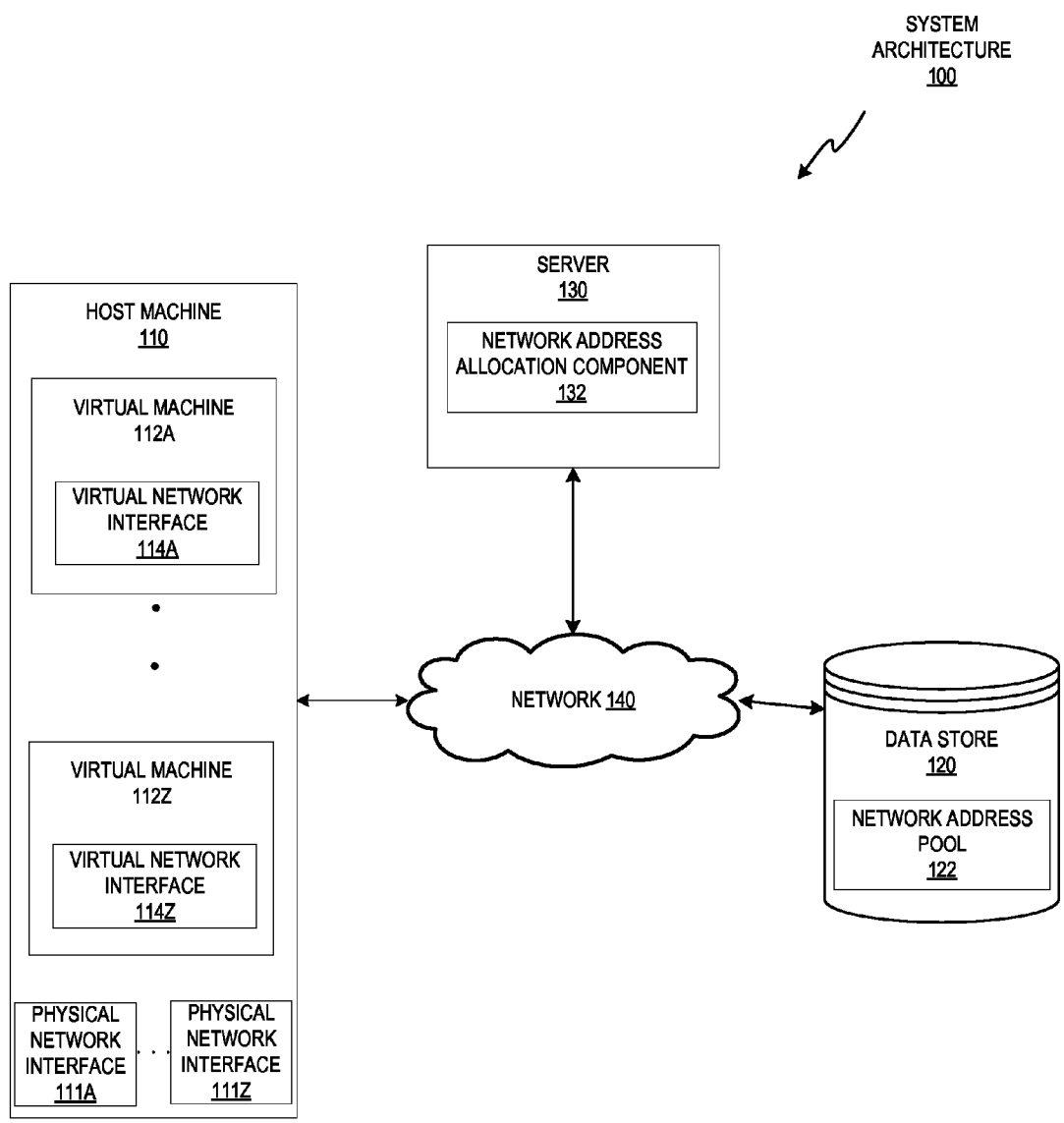
FIG. 1 depicts a high-level diagram of an example system architecture in accordance with one or more aspects of the present disclosure.

Described herein are methods and systems for managing pools of network addresses. "Network address" herein shall refer to an identifier that is associated with a network interface to distinguish the network interface from other network interfaces on a computer network. In one example, a network address may be an OSI layer 2 network address (e.g., MAC address) and may be assigned to a physical or virtual network interface.

"Data structure" herein shall refer to a particular way of organizing data associated with a pool of network addresses. The data structure may include elements that indicate whether a corresponding network address is available or unavailable (e.g., in use).

In accordance with one or more aspects of the present disclosure, a virtual data center or a cloud infrastructure may have a large number of virtual machines (e.g., several thousand) and each of the virtual machines (VMs) may have one or more virtual network interfaces. A virtual interface may be assigned a network address from a pool of network addresses as the virtual interfaces are created, for example, a network address may be dynamically allocated to the virtual interface before, during or after the creation of the virtual interface. This may require storing the network address pools and tracking address availability status. In one example, the pool of network addresses may begin, for example, at 00:00:00:00:00:00 and end at 00:00:00:FF:FF:FF and each network address may be a 48 bit MAC address. Storing each network address individually may result in the excessive usage of storage space (e.g., nearly 100 MB). Often the pool of network addresses is stored in memory and thus the size of the storage and the efficiency of locating available network address may be important to the overall performance of the data center.

Aspects of the present disclosure may reduce the amount of storage space and may enhance the ability to identify available network addresses by introducing a mechanism and data structure for storing and managing network address pools. The data structure may include multiple elements that represent a range of network addresses. A first element may correspond to a starting network address of the range and the last element may correspond to a last address of the range. Each element may be associated with an index value that identifies the element's position within the data structure and may include an entry that indicates whether the network address is available (e.g., available state). Identifying an available network address may involve searching the data structure for an entry with an available state and utilizing the entry's index value as an offset to determine the corresponding network address. For example, the index value may be added to the beginning network address to located the value of the network address. Searching the data structure may be more efficient because each element may be smaller than the actual network address and the comparisons associated with searching may require less computing resources (e.g., memory, processor cycles). In one example, the data structure may include a bit array and each network address may be represented as a single bit, as opposed to a 48 bit MAC address. Therefore a range of 16 million network addresses may be stored using a single beginning and end network address (e.g., 48 bits each) and a 16 million bit array. This may require approximate 2 MB, which is considerable less than the 100 MB discussed above.

Various aspects of the above referenced methods and systems are described in details herein below by way of examples, rather than by way of limitation.

FIG. 1 illustrates an example system 100, in accordance with an implementation of the disclosure. The system 100 includes host machine 110, a data store 120, a server 130 and a network 140. In one implementation, network 140 may include a public network (e.g., the Internet), a private network (e.g., a local area network (LAN) or wide area network (WAN)), a wired network (e.g., an Ethernet network), a wireless network (e.g., an 802.11 network or a Wi-Fi network), a cellular network (e.g., a Long Term Evolution (LTE) network), routers, hubs, switches, server computers, and/or a combination thereof.

Host machine 110 may provide virtualization for virtual machines 112A-Z. Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Network interface virtualization may be implemented by the hypervisor and may provide virtual machines 112A-Z access to physical network interfaces 111A-Z via virtual network interfaces 114A-Z.

Physical network interfaces 111A-Z may be computer hardware components that connect host 110 to computer to network 140. Each computer hardware component may be a network interface controller (NIC) that supports a specific physical layer and data link layer standard such as Ethernet, Fibre Channel, Wi-Fi, Token Ring or other similar networking protocol. Each of physical network interfaces 111A-Z may be associated with one or more network addresses that are associated with different networking layers. For example, a physical network interface may be associated with an OSI layer 2 address, which may be represented by a link layer address (e.g., a MAC address). The physical network interface may also be associated with one or more network addresses at a different OSI layers, such as layer 3 (an Internet Protocol (IP) address).

Virtual network interfaces 112A-Z may be an abstract virtualized representation of a computer network interface. Each virtualized network interface may or may not correspond to a physical network interface. Likewise, each of virtual network interfaces 111A-Z may be associated with one or more network addresses that are associated with different networking layers, for example, a virtual network interface may be associated with an OSI layer two 2 address, which may be represented by a link layer address (e.g., a MAC address). In another example, a virtual network interface may be further associated with one or more network addresses at a different OSI layers, such as layer 3 (an Internet Protocol (IP) address).

Virtual network interfaces 112A-Z may be created when a virtual machine is generated (e.g., virtual machine image creation) or when the virtual machine is instantiated (e.g., executed). Virtual network interfaces 112A-Z may also be generated during the operation of the virtual machine, for example, a user may log into a virtual machine and initiate the creation of a new virtual network interface while the virtual machine is running. When a virtual network interface is generated it may be associated with a network address from a pool of network addresses, such as network addresses pool 122.

Network address pool 122 may be stored in data store 120 and may include multiple network addresses within a range of network addresses. The range of network addresses may have a start network address and an end network address and may include some or all of the network addresses there between. Not every address in a pool or a range may be eligible to be assigned to a network interface, for example, some network addresses may be ineligible because they are designated for a special purpose, such as a broadcast or multicast network address.

Network address pool 122 may be represented by a data structure that may be stored in RAM and/or in storage memory. The data structure may be an array or list of elements or other similar data structure. Each element of the data structure may represent a network address and may comprise an indicator of the availability state of the corresponding network address. For example, one state may indicate that the address is available for use and another state may indicate the address is unavailable for use. An address may be unavailable for use for multiple different reasons, for example, the address may already be in use by a network interface, it may have been previously assigned, or it may be designated as a static address. The address may also be unavailable if a networking protocol designates the address for an alternate use, such as broadcast or multicast addresses. Some protocols also designate certain addresses or ranges of addresses for specific functions or specific types of network nodes, such as for example, the first address in a range of network addresses may be associated with a network interface of a router (e.g., gateway).

Server 130 may include a network address allocation component 132 for managing network address pool 122. Managing the network address pool 122 may involve identifying which network addresses are available and which network address are in use. Network address allocation component 132 may receive requests from another component on server 130 and may respond with one or more available network addresses. Network address allocation component 132 may process the requests by accessing the data structure discussed above and searching the data structure to identify a network address that is available.

Server 130 may also perform functions in addition to those performed by network address allocation component 132. In one example, server 130 may include a orchestration service that may create and/or configure virtual machine images. A virtual machine image may be a file or structure that represents a virtual machine and may accessed by host server 110 and instantiated as one or more virtual machines 112A-Z. In another example, server 130 may include a dynamic host configuration protocol (DHCP) service that may dynamically distribute network configuration parameters including network addresses in the form of IP addresses.

Figure 2:
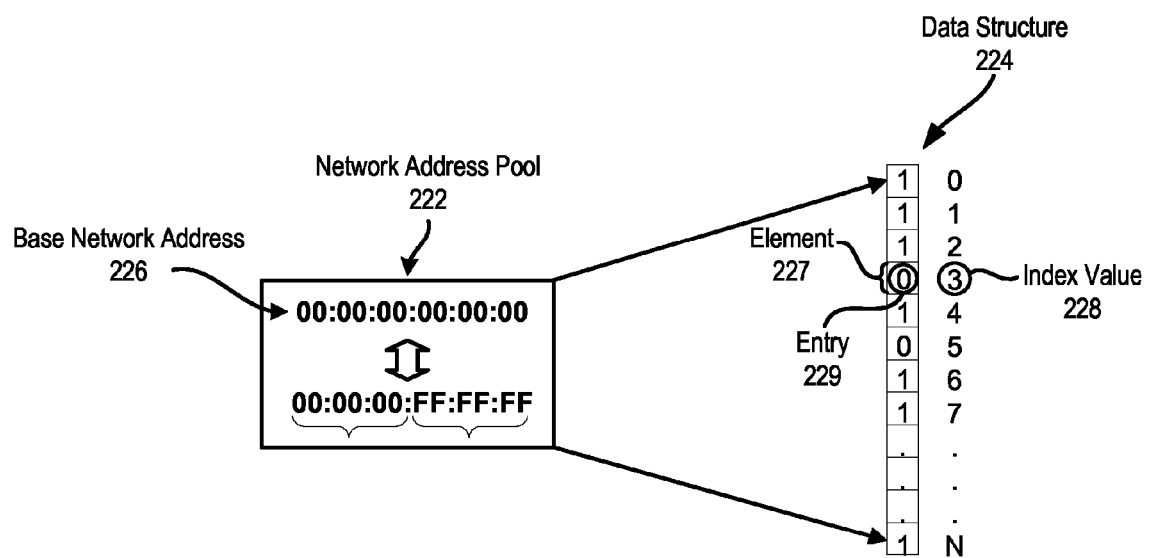
FIG. 2 depicts a block diagram of an illustrative embodiment of a data structure for storing a pool of network addresses in accordance with one or more aspects of the present disclosure.

FIG. 2 depicts a block diagram of an exemplary system 200 that includes a network address pool 222 and data structure 224. Network address pool 222 may include one or more ranges of network addresses. A range may begin at base network address 226 and may extend to an end network address. Each network address may comprise a unique identifier of any size, for example, 48 bit, 64 bit 128 bit or any other size. As shown in FIG. 2, the network addresses may be a MAC address and each address may be visually represented as six groups of two hexadecimal digits, which may be separated by colons or hyphens.

Data structure 224 may represent the availability of network addresses within network address pool 222. Data structure 224 may include multiple elements (e.g., elements 0-N) and each element may correspond to a network address from network address pool 222. The first element of data structure 224 may correspond to the first network address of the range of network addresses (e.g., base network address 226) and the last element of the data structure 224 may correspond to the last network address. In one example, data structure 224 may be a bit array, a bit map or other similar structure. A bit map may be a type of array in which each array element includes a bit with a value of 0 (e.g., false) or 1 (e.g., true). Each element of data structure 224 may be associated with an index value and an entry.

The index values (e.g., index value 228) may indicate the position of the element within the data structure and may begin at zero and increment by one for each element, such that the first element has an index value of 0 and the last element has a value of N−1. In one example, the index value may be an offset of the element relative to the base of the data structure and may not be stored as a value within the data structure. In another example, the index value may be stored within the data structure or element to identify the element's position.

Each entry (e.g., entry 229) may include a value that indicates whether the corresponding network address is available or unavailable. As shown, the entry may be binary and may represent two distinct states. A first state (e.g., available state, un-allocated state) may indicate the corresponding network address is available for use by a network interface, as shown by the value "0" within element 226. The second state may indicate the corresponding network address is unavailable (e.g., previously allocated), as shown by an entry of "1" within the first element.

In one example, system 200 may include an abstract interface that utilizes data structure 224 as a backend implementation, which may reduce the quantity of storage space required for network address pool 222 and may reduce the time required to identify an available network address. System 200 may construct data structure 222 based on predefined range or ranges that may be provided by, for example, a system administrator. The predefined range may include a beginning network address and an end addresses, for example a beginning network address may be F0:00:00:00:00:00 and an end network address may be F0:00:00:FF:FF:FF. The backend implementation of the abstract interface may store beginning and end network values and may use them to compute that the necessary range of the data structure, for example based on the above network addresses the size may be approximately 16,777,216. Therefore, a data structure (e.g., bit array) with 16,777,216 elements may be generated by system 200 to represent the address range. In one example, each element may have a one bit size and each element entry may be set to zero when it is initialized. The zero value may represent an available or unavailable network address. Once system 200 has created and initialized the data structure it may beused to process requests for network addresses.

System 200 may receive requests for network addresses from other devices and may process the requests and respond with one or more available network addresses. Processing the request may involve identifying an available network address, which may be performed in the multiple ways. One way of identifying an available network address may include a linear search, which may run from the beginning of the bit array and may return the index of the first element having an available state, for example, the first element with an entry with a value of "0". The second way of identifying an available network address may include iterating through randomly selected elements of the data structure until an element having an available state is identified. In one example, iterating may involve inspecting an entry of an element and if the entry does not indicate an available state then selecting another random index value and inspecting the corresponding element. When system 200 identifies an element corresponding to an available network address system 200 may combine the index value of the identified element with the start address of the range to calculate the available network address. For example, if the first element having an available state is at index 654,321 then system 200 would add F0:00:00:00:00:00 decimally represented as 263882790666240 to it resulting in 263882791320561 which represents the MAC address F0:00:00:09:FB:F1.

System 200 may also receive requests that already include a specific network address in which case system 200 may confirm the network address is available for use. The included network address may be converted to a number, for example the network address F0:00:00:12:34:56 may be converted to the number 1193046. This number may be compared to the base address of the network pool to determine an offset for the data structure. In one example, base address 226 may be the beginning address and may be converted to a number and subtracted from the number of the specified address to determine the offset. The offset may be used to identify an element within the data structure without searching the data structure, for example, the offset may be used as an index value to identify the element associated with the specified network address. System 200 may then modify the element corresponding to the index value to change its state from available (e.g., entry value=0) to not available (e.g., entry value=1) or vice versa.

In some examples, the pool of network address may include network addresses from multiple ranges. The ranges may be adjacent ranges, separate ranges or overlapping ranges. Two ranges may be adjacent ranges when an ending address of one range precedes the beginning network address of another range without having any intermediate network addresses. Two ranges may be separate ranges when neither range includes a network address in the other. Two ranges may be overlapping ranges when one or more network addresses are included within both ranges. Overlapping ranges may occur when combining existing networks that utilize the same or similar range of network addresses.

When the pool of network addresses includes multiple ranges, system 200 may utilize one or more data structures. In one example, system 200 may merge the address ranges into a single composite range, which may be associated with a single data structure. In another example, system 200 may associate the pool of network addresses with multiple data structures and each data structure may correspond to one or more ranges of network addresses. The process of merging address ranges may include removing duplicate entries as well as removing addresses that are unavailable to be assigned to a network interface (e.g., multicast addresses, previously assigned static addresses). Removing an address may involve updating the element corresponding to the unavailable address to an unavailable state.

As described above the network addresses may be layer two (e.g., link layer) network identifiers, however the network address may also or alternatively be ISO layer 3 (e.g., transport layer) network identifiers, such as Internet Protocol (IP) addresses or networking port numbers.

Figure 3:
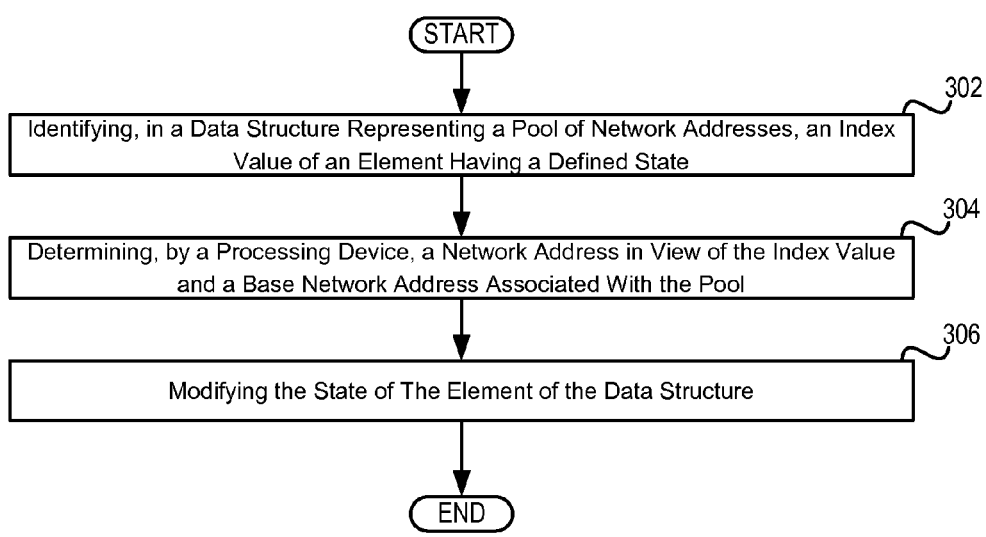
FIG. 3 depicts a flow diagram of an example method for managing a pool of network addresses in accordance with one or more aspects of the present disclosure.
Figure 4:
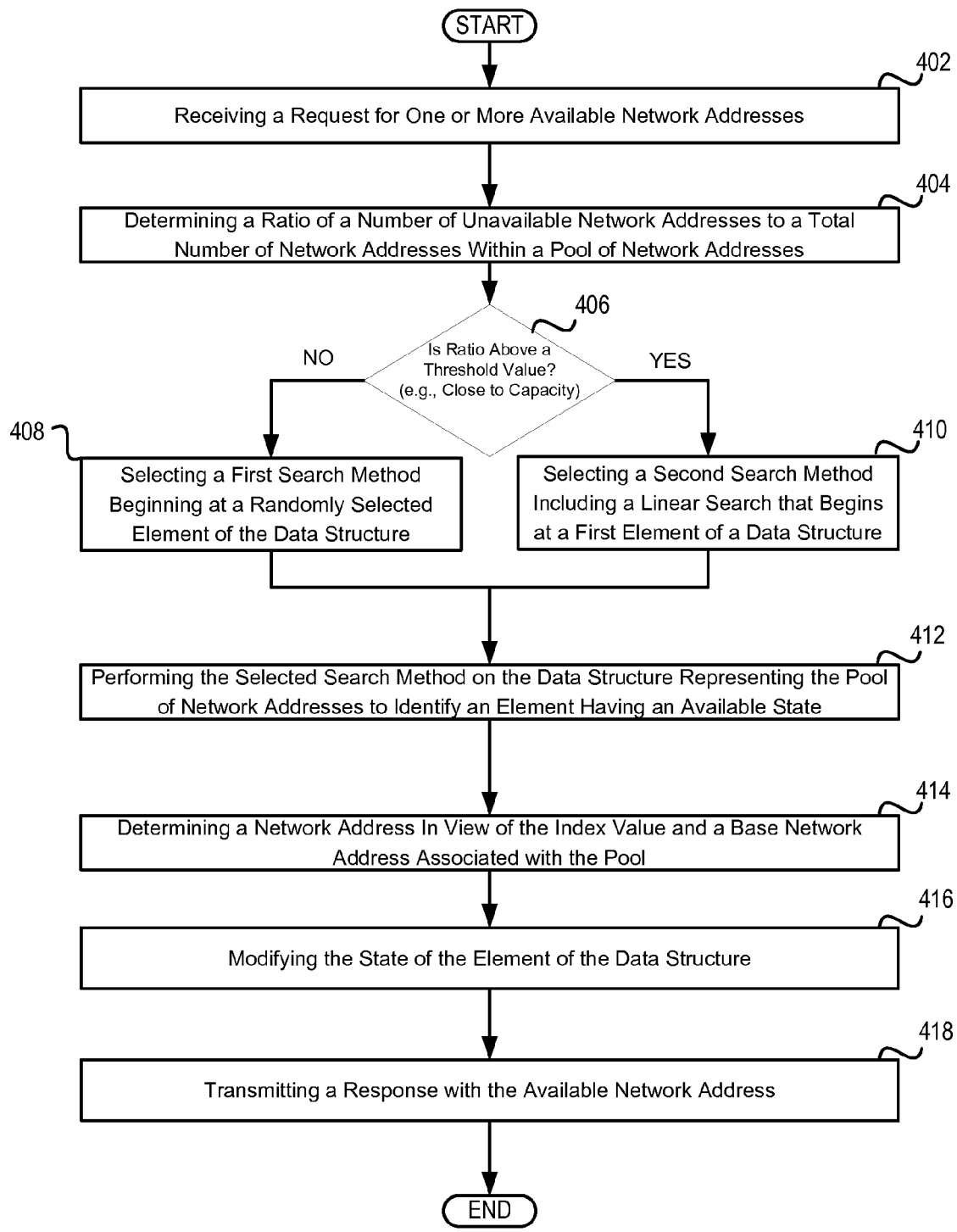
FIG. 4 depicts a flow diagram of another example method for managing a pool of network addresses in accordance with one or more aspects of the present disclosure.

FIG. 3 and FIG. 4 depict flow diagrams for illustrative examples of methods 300 and 400 for managing a pool of network addresses. Method 300 may include steps to identify an available network address and method 400 may include additional steps for processing network address requests and variations on searching the data structure. Methods 300 and 400 may be performed by processing devices that may comprise hardware (e.g., circuitry, dedicated logic), software (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by network allocation component 132 as shown in FIG. 1.

Referring to FIG. 3, method 300 may be performed by processing devices of a server device or a client device and may begin at block 302. At block 302, the processing device may identify, in a data structure representing a pool of network addresses, an index value of an element having a defined state. The data structure may include a bit array with multiple elements and each element may correspond to a respective network address within the pool of network addresses. The defined state of an element may indicate whether the corresponding network address is available for use by a network interface (e.g., available state) or whether the network address is unavailable for use by a network interface (e.g., unavailable state). Identifying the index value of the element may involve searching the multiple elements of the data structure to locate an available element.

At block 304, the processing device may determine a network address in view of the index value and a base network address associated with the pool. The network address may be a data link layer address, such as a MAC address, representing a unique identifier to be associated with a virtual network interface. The network address may also be a network layer address, such as an IP address. The base network address may be a starting network address value and calculating the network address involve combining (e.g., adding) the base network address value and the index value to produce a combined value and converting the combined value to a MAC address format.

At block 306, the processing device may modify the state of the element of the data structure. Modifying the state may include changing the entry value of the element corresponding to the index value from an available state to an unavailable state. This may indicate that the associated network address is in use or will subsequently be in use by a network interface and therefore may no longer be allocated to another network interface.

Referring now to FIG. 4, method 400 may be similar to method 300 and may include some or all of the steps of method 300 and may add additional steps. Method 400 may be performed by processing devices of a server device or a client device and may begin at block 402.

At block 402, the processing device may receive a request for one or more available network addresses. The request may provide information about the host machine, the virtual machine, the user, the network interface, or some combination thereof. In one example, the request may specify a quantity of addresses (e.g., 1, 2, 5 addresses) without identifying a specific address. In another example, the request may identify a specific network address and the processing device may utilize the data structure to confirm the specified address is available. In other examples, the request may include parameters (e.g., within a certain range of addresses) that the resulting network address may satisfy.

The request may be initiated by a virtual machine, a host machine, or other machine such as one that generates or configures virtual machine images. Initiating a request may involve constructing the request and transmitting the request to a remote device (e.g., device over a network). The machine that initiates the request may be the same machine that receives the subsequent response with the network address. In one example, a virtual machine may initiate a request when the virtual machine initiates the creation of a new network interface. In another example, the host machine may initiate a request for a network address for a virtual network interface prior to or in response to running a virtual machine image that includes the virtual network interface. In yet another example, machines other than the virtual machine and host machine may initiate the request. The other machine may be, for example, a provisioning server that creates and configures a virtual machine but may not actually host the virtual machine.

At block 404, the processing device may determine a ratio that indicates the capacity of the pool and a proportion of available or unavailable network addresses. The ratio may be determined by a number of unavailable network addresses to a total number of network addresses within the pool. The ratio may be represented as a percentage ratio that indicates how occupied the network address pool is, wherein 0% indicates the address pool is empty and all the addresses are available and 100% indicates the address pool is fully utilized and no network addresses are available. The ratio may also be represented as a fraction or other similar numeric relationship. In one example, the ratio may be determined (e.g., calculated) in view of one or more of the total number of network addresses within the pool, the total number of available addresses within the pool or the total number of unavailable addresses within the pool or other similar measurement or combination thereof.

The ratio may be continuously or periodically updated and may be stored within the data structure or in a separate structure, which may be associated with the data structure. Continuously updating the ratio may involve re-computing the ratio when an element of the data structure is modified, for example, each time an element changes from an available state to an unavailable state or vice versa. Periodically updating the ratio may involve re-computing the ratio after a predetermined duration of time, such as every second, 60 seconds, hour, day, or other similar duration of time. The periodic updating may also be based on a quantity of network address transactions (e.g., requests), such as for example, for every 100, 500, 1000 or other number of requests the ratio may be re-computed.

At block 406, the processing device may determine if the ratio (e.g., capacity ratio) is above a threshold value and may select a method to search data structure 224. The threshold value may be a percentage ratio, such as a value of 90% or any other value in the range of 50%-100%. If the ratio is not above the threshold value the processing device may proceed to block 408 and select a first search method. If the availability ratio is above the threshold value the processing device may proceed to block 410 and select a second search method.

At block 408, the processing device may select a first search method in response to the ratio being below a threshold (e.g., less than 90% of addresses in use). The first method may involve a search that randomly selects elements of the data structure and iterates through multiple randomly selected elements until an element corresponding to an available network address is identified. When the pool has no available network addresses it may iterate through all or substantially all of the elements of the data structure.

At block 410, the processing device may select a second search method in response to the ratio being above a threshold (more than 90% of addresses in use). The second search method may involve a linear search that may begin at a first element of the data structure and may end iterate through multiple consecutive elements until either it identifies an element having an available state or the last element of the data structure when no elements have an available state. In other examples, the linear search may being at an element other than the first element (e.g., a random starting element) and may iterate consecutively through multiple elements and loop from the last element of the data structure back to the first element of the data structure or vice versa.

At block 412, the processing device may perform the selected search method on the data structure representing a pool of network addresses to identify an element having an available state. Block 412, 414, and 416 may be similar to block 302, 304 and 306 respectively and were discussed with reference to FIG. 3.

At block 418, the processing device may transmit a response that includes the available network address. In one example, the processing device may transmit the response to another component on the same machine (e.g., provisioning server), which may be responsible for configuring the virtual machine. The other component may be the same component or different from the component that sent the request. In another example, the processing device may transmit the response over a network to a remote device hosting the virtual machine (e.g., host machine) or may transmit the response to a VM that initiated the creation of the virtual interface. The remote device may be the same device or different from the device that sent the request. Responsive to completing the operations described herein above with references to block 418 the method may terminate.

In addition to the features discussed above, method 300 and 400 may also include a step of merging a plurality of network address ranges into the pool of network addresses. The merging may involve removing elements associated with duplicate network addresses.

Figure 5:
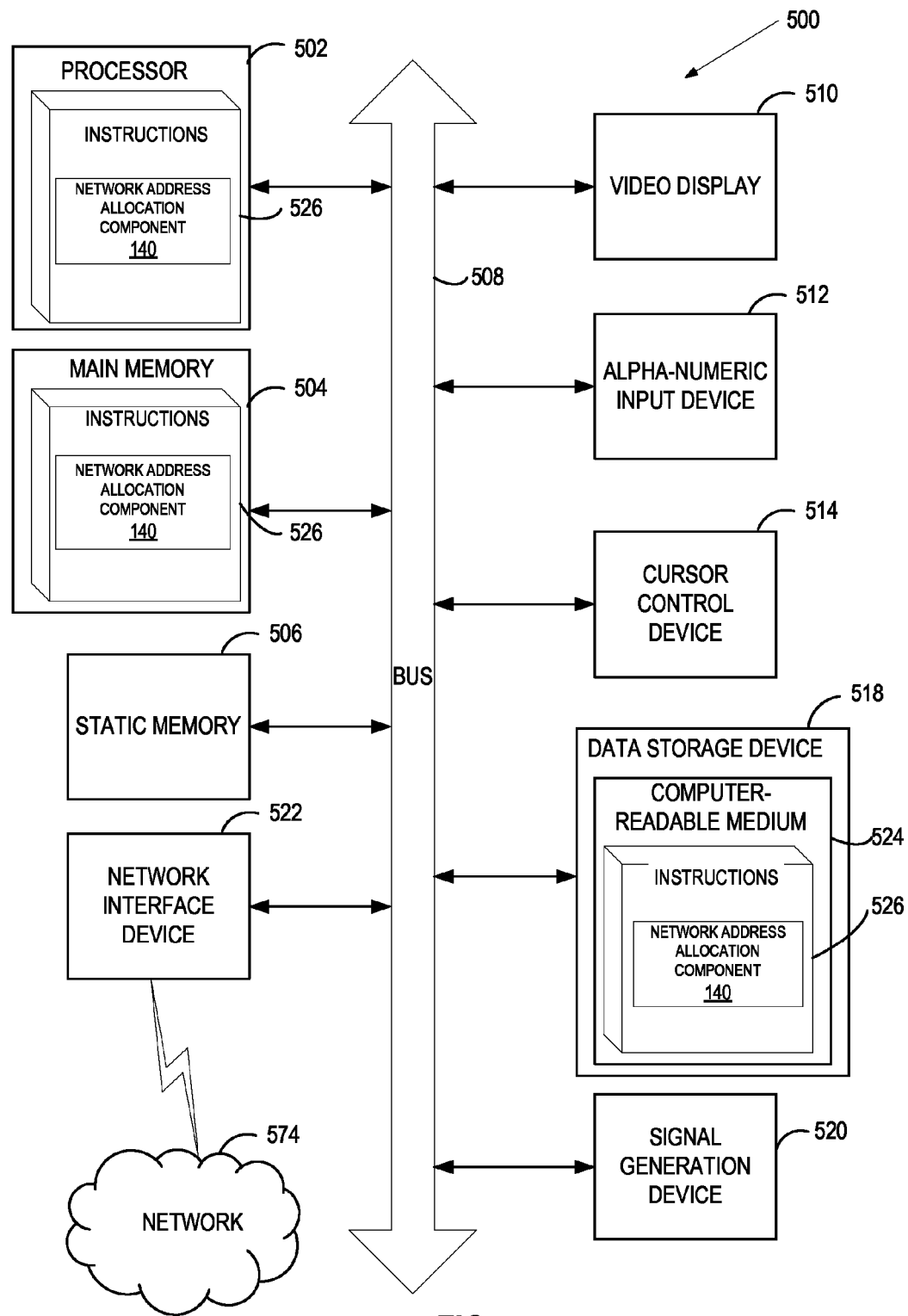
FIG. 5 depicts a block diagram of a computer system operating in accordance with one or more aspects of the present disclosure.

FIG. 5 depicts a block diagram of a computer system operating in accordance with one or more aspects of the present disclosure. In various illustrative examples, computer system 500 may correspond to example system architecture 100 of FIG. 1.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processor 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processor 502 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), and a cursor control device 514 (e.g., a mouse).

Data storage device 516 may include a non-transitory computer-readable storage medium 524 on which may store instructions 526 encoding any one or more of the methods or functions described herein, including instructions encoding network address allocation component of FIG. 1 implementing methods 300 or 400.

Instructions 526 may also reside, completely or partially, within main memory 504 and/or within processor 502 during execution thereof by computer system 500, hence, main memory 504 and processor 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   determining a ratio of unavailable network addresses within a pool of network addresses;
   selecting a search method from a plurality of search methods based on the ratio of unavailable network addresses;
   identifying, in a data structure representing the pool of network addresses, an index value of an element in view of the selected search method;
   determining, by a processing device, a network address in view of the index value and a base network address associated with the pool; and
   modifying a state of the element in the data structure representing the pool of network addresses.

2. The method of claim 1, wherein the network address is a data link layer address representing a unique identifier to be associated with a virtual network interface.

3. The method of claim 1, further comprising:
   receiving a request over a network for an available network address; and
   transmitting a response over the network with the determined network address.

4. The method of claim 1, wherein the data structure comprises a bit array comprising a plurality of elements, each element of the plurality of elements corresponding to a respective network address within the pool of network addresses.

5. The method of claim 1, wherein the state indicates whether the corresponding network address is available for use by a network interface.

6. The method of claim 1, wherein determining the ratio of unavailable network addresses comprises:
   identifying a number of unavailable network addresses within the pool of network addresses; and
   identifying a total number of network addresses within the pool of network addresses.

7. The method of claim 6, wherein selecting the search method comprises selecting a first search method in response to the ratio being below a threshold value, the first search method comprising iterating through randomly selected elements until an element corresponding to an available network address is identified.

8. The method of claim 7, wherein selecting the search method comprises selecting a second search method in response to the ratio being above the threshold value, the second search method comprising a linear search that begins at a first element of the data structure and ends in response to identifying an element corresponding to an available network address.

9. The method of claim 1, wherein determining the network address comprises:
   adding a value of the base network address and the index value to produce a combined value; and
   converting the combined value to a MAC address format.

10. The method of claim 1 further comprising, merging a plurality of network address ranges into the pool of network addresses, wherein the merging comprises removing elements associated with duplicate network addresses.

11. The method of claim 1, wherein the determining a network address in view of the index value is performed by a machine that creates virtual machine images.

12. The method of claim 1, wherein the network addresses are Internet Protocol (IP) addresses and wherein the determining a network address in view of the index value is performed by a dynamic host configuration protocol (DHCP) server.

13. A system comprising:
   a memory; and
   a processing device communicably coupled to the memory, the processing device to:
      determine a ratio of unavailable network addresses within a pool of network addresses;
      select a search method from a plurality of search methods based on the ratio of unavailable network addresses;
      identify, in a data structure representing the pool of network addresses, an index value of an element in view of the selected search method;
      determine a network address in view of the index value and a base network address associated with the pool; and
      modify a state of the element in the data structure representing the pool of network addresses.

14. The system of claim 13, wherein the network address is a data link layer address representing a unique identifier to be associated with a virtual network interface.

15. The system of claim 13, wherein the processing device is further to:
receive a request over a network for an available network address; and
transmit a response over the network with the determined network address.

16. The system of claim 13, wherein the data structure comprises a bit array comprising a plurality of elements, each element of the plurality of elements corresponding to a respective network address within the pool of network addresses.

17. A non-transitory machine-readable storage medium storing instructions that cause a processing device to:
determine a ratio of unavailable network addresses within a pool of network addresses;
select a search method from a plurality of search methods based on the ratio of unavailable network addresses;
identify, in a data structure representing the pool of network addresses, an index value of an element in view of the selected search method;
determine, by a processing device, a network address in view of the index value and a base network address associated with the pool; and
modify a state of the element in the data structure representing the pool of network addresses.

18. The non-transitory machine-readable storage medium of claim 17, wherein the network address is a data link layer address representing a unique identifier to be associated with a virtual network interface.

19. The non-transitory machine-readable storage medium of claim 17, wherein the data structure comprises a bit array comprising a plurality of elements, each element of the plurality of elements corresponding to a respective network address within the pool of network addresses.

20. The non-transitory machine-readable storage medium of claim 17, wherein the state indicates whether the corresponding network address is available for use by a network interface.

* * * * *